United States Patent
Ohkubo et al.

(10) Patent No.: US 7,320,523 B2
(45) Date of Patent: Jan. 22, 2008

(54) LIQUID-COOLED LIQUID CRYSTAL PANEL AND METHOD OF MANUFACTURING THE SAME AS WELL AS LIQUID CRYSTAL PROJECTOR

(75) Inventors: Takuji Ohkubo, Chiba (JP); Dai Yoneya, Tokyo (JP); Yoshiro Asano, Chiba (JP); Hiroaki Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 11/125,902

(22) Filed: May 10, 2005

(65) Prior Publication Data
US 2005/0270495 A1 Dec. 8, 2005

(30) Foreign Application Priority Data
May 14, 2004 (JP) .......................... P2004-145121

(51) Int. Cl.
G03B 21/16 (2006.01)
G03B 21/18 (2006.01)
H04N 5/74 (2006.01)
G02F 1/1333 (2006.01)
H05K 7/20 (2006.01)

(52) U.S. Cl. ............................ 353/54; 353/52; 353/56; 348/748; 349/161; 361/689; 361/699

(58) Field of Classification Search ................ 353/56, 353/52, 54, 57, 60, 61; 348/748; 349/161; 361/687–689, 698, 699, 701, 704, 707, 831
See application file for complete search history.

(56) References Cited

U.S. PATENT DOCUMENTS

| 4,759,499 A | * | 7/1988 | Gusinde et al. | ........ 237/12.3 B |
| 2002/0135741 A1 | * | 9/2002 | Lee et al. | ...................... 353/61 |
| 2003/0231271 A1 | * | 12/2003 | Saitoh | ........................ 349/122 |

* cited by examiner

Primary Examiner—Rochelle Blackman
(74) Attorney, Agent, or Firm—Sonnenschein Nath & Rosenthal LLP

(57) ABSTRACT

A liquid crystal panel in which temperature rise of the liquid crystal panel is sufficiently restrained by cooling the panel by means of a cooling liquid, and exudation of the cooling liquid toward the liquid crystal material is prevented. Disclosed are cover members attached to the liquid crystal panel that form cavities on the light entrance and exit sides of the panel. The cover members are such that a sealed portion of the liquid crystal material is not in contact with the cavities. The cover members are light transmitting. The cavities are filled with the cooling liquid.

16 Claims, 9 Drawing Sheets

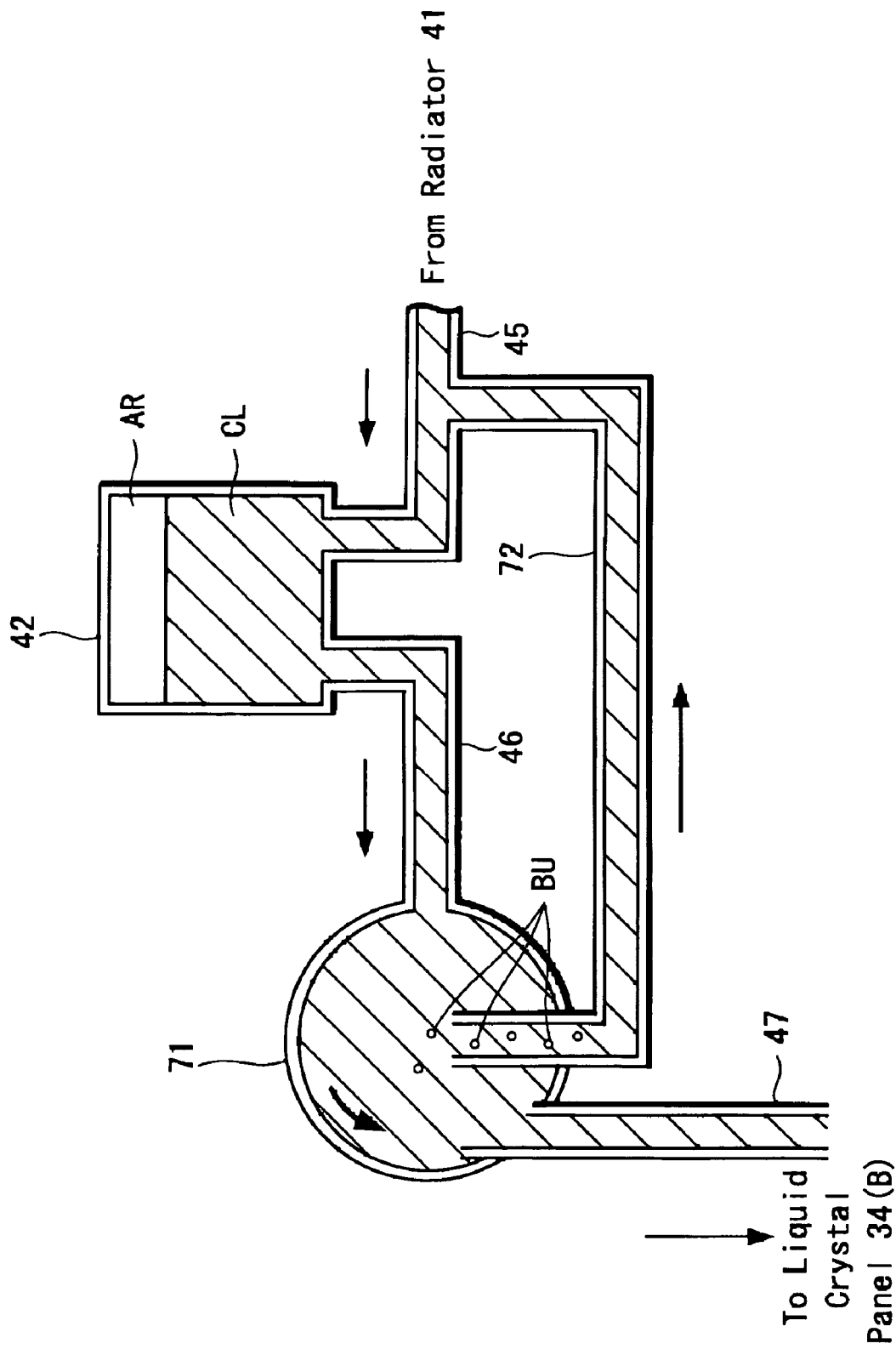

LIQUID-COOLED LIQUID CRYSTAL PANEL AND METHOD OF MANUFACTURING THE SAME AS WELL AS LIQUID CRYSTAL PROJECTOR

CROSS REFERENCES TO RELATED APPLICATIONS

The present invention contains subject matter related to Japanese Patent Application JP 2004-145121 filed in the Japanese Patent Office on May 14, 2004, the entire contents of which being incorporated herein by reference.

BACKGROUND OF THE INVENTION

1. Field of the Invention

The present invention relates to a liquid crystal panel and a liquid crystal projector, and particularly to the ones in which the liquid crystal panel is cooled by cooling liquid.

2. Description of the Related Art

A liquid crystal projector has been widely used as a projection type display apparatus having a large screen. As is known, a liquid crystal projector is an apparatus in which light emitted from a light source is made to enter a liquid crystal panel through an illumination optical system and light modulated in the liquid crystal panel according to an image signal is projected by a projection lens.

In order to obtain high luminance of the liquid crystal projector, there is a need for increasing the amount of light entering the liquid crystal panel by increasing the amount of light emitted from the light source, enhancing the efficiency in utilizing light in the illumination system and the like. However, when the amount of light entering the liquid crystal panel increases, temperature of the liquid crystal panel rises and therefore unfavorable effect may occur with respect to reliable operation of the liquid crystal projector. Accordingly, in order to suppress the rise in temperature of the liquid crystal panel, the liquid crystal panel needs to be cooled.

In the past, air from a fan is used to cool a liquid crystal panel in a liquid crystal projector as a method for cooling the liquid crystal panel.

However, these days, not only high luminance but also miniaturization and low noise are in demand with respect to a liquid crystal projector. Therefore, the above air-cooling method may have a disadvantage in light of design of a liquid crystal projector.

Specifically, since the air in a liquid crystal projector is warm in general, it is desirable to cool a liquid crystal panel by taking air from the outside of the liquid crystal projector, however, in order for air from the outside to be taken in, an opening through which the outside air is taken by a fan needs to be provided in a casing of the liquid crystal projector and also an air duct needs to be provided in the liquid crystal projector to lead the outside air into the liquid crystal panel. Further, a filter to remove dust from the air taken needs to be provided. Since comparatively large space is required for such an opening for taking air in, an air duct and a filter, miniaturization of the liquid crystal projector may be limited. Furthermore, there is also a limit in reducing noise caused by the fan.

As a cooling method to comply with the need for miniaturization and low noise, there is a method of cooling a liquid crystal panel with cooling liquid. As the liquid-cooled method, the following methods (1) and (2) have been proposed.

(1) A method in which the whole of the liquid crystal panel is immersed in liquid in a container (2) A method in which a transparent sealed container having an input and output portion of cooling liquid is attached on the light source side (light entering side) of a liquid crystal panel and cooling liquid is circulated between the sealed container and a heat exchanger (refer to, for example, Published Japanese Patent Application No. H5-264947 (paragraphs No. 0010 to 0016 and FIG. 1))

However, in the liquid-cooled method (1), there is a possibility that the cooling liquid may exude into a liquid crystal material from a sealed portion where the liquid crystal material is sealed.

Further, in the above-described method (1), natural convection is caused in the cooling liquid due to the difference between temperature at a position close to the liquid crystal panel and temperature at a position other than that, and the natural convection is projected as a striped pattern on a screen.

Further, in the liquid-cooled method (2), since the side (light emitting side) opposite to the light source side of the liquid crystal panel is not cooled, the temperature rise of the liquid crystal panel may not sufficiently restrained.

Furthermore, in the liquid-cooled method (2), if bubbles are generated in the process of circulating the cooling liquid, the bubbles are projected as a dot pattern on the screen.

Moreover, in the liquid-cooled method (2), a load of the sealed container and piping is applied to the liquid crystal panel, which may cause registration (positioning of pictures of R (red), G (green) and B (blue)) to be displaced in a three-panel liquid crystal projector provided with three liquid crystal panels of R, G and B.

Therefore, it is desirable to obtain a technology in which the rise in temperature of a liquid crystal panel is sufficiently restrained by cooling the liquid crystal panel using cooling liquid and the exudation of the cooling liquid toward a liquid crystal material is prevented.

SUMMARY OF THE INVENTION

A liquid-cooled liquid crystal panel according to an embodiment of the present invention includes a cover member attached to the liquid crystal panel, which forms cavities on the light entering side and on the light emitting side of the liquid crystal panel and covers the liquid crystal panel such that a sealed portion of a liquid crystal material is not faced to the cavities, and which transmits light entering the liquid crystal panel and light emitted from the liquid crystal panel, in which the cavities are filled with cooling liquid.

According to the liquid-cooled liquid crystal panel, the cover member is attached to the liquid crystal panel, which covers the liquid crystal panel to form cavities on the light entering side and on the light emitting side and which transmits light entering the liquid crystal panel and light emitted from the liquid crystal panel, in which the cavities are filled with cooling liquid. Accordingly, both of the light entering side and the light emitting side are cooled by the cooling liquid, so that rise in temperature of the liquid crystal panel can sufficiently be restrained.

Further, the cover member covers the liquid crystal panel such that the sealed portion of the liquid crystal material is not faced to the cavities. Therefore, since the sealed portion is prevented from being immersed in the cooling liquid filled in the cavities, the exudation of the cooling liquid into the liquid crystal material is prevented.

Further, as an example, it is preferable in the above liquid-cooled liquid crystal panel that the cover member is respectively attached to a substrate on the light entering side of the liquid crystal panel and to a substrate on the light emitting side thereof through a first transparent glass plate and a second transparent glass plate each having the size approximately equal to the respective substrates. Accordingly, since the transparent glass plate and the substrate of the liquid crystal panel are in surface contact with each other and load due to the cover member is dispersed to the whole of the substrate, load can be prevented from localizing onto the liquid crystal panel.

Further, as an example, it is preferable in the liquid-cooled liquid crystal panel that a polarizing plate to make predetermined linearly polarized light enter the liquid crystal panel and a polarizing plate to make predetermined linearly polarized light transmitted in the light emitted from the liquid crystal panel are attached to the cover member to be faced to the cavities. Accordingly, those polarizing plates are in contact with the cooling liquid filled in the cavities, so that those polarizing plates can be cooled as well.

Further, as an example, it is preferable in the liquid-cooled liquid crystal panel that the cover member is provided with holes connecting the cavity and the outside. Accordingly, a circulation path for circulating the cooling liquid between the cavities and the outside is formed, so that the liquid crystal panel can be cooled further efficiently. Further, with forming such circulation path, natural convection due to the difference in temperature of the cooling liquid in the cavities can be prevented from generating, so that the natural convection is prevented from being projected on a screen as a striped pattern.

Next, a method of manufacturing a liquid-cooled liquid crystal panel according to an embodiment of the present invention in which a cover member attached to the liquid crystal panel forms cavities on the light entering side and on the light emitting side of the liquid crystal panel, covers the liquid crystal panel such that a sealed portion of a liquid crystal material is not faced to the cavities, and makes light entering the liquid crystal panel and light emitted from the liquid crystal panel transmit and in which the cavities are filled with cooling liquid, includes the steps of: forming the cavities by making the cover member attach to a first transparent glass plate and a second transparent glass plate which are approximately equal to a light entering side substrate and a light emitting side substrate, respectively; and attaching the first transparent glass plate and the second transparent glass plate to which the cover member is attached respectively to the light entering side substrate and the light emitting side substrate of the liquid crystal panel, respectively.

According to the above method of manufacturing the liquid-cooled liquid crystal panel, first, the cover member is attached to the first transparent glass plate and the second transparent glass plate which have approximately equal size to that of the light entering side substrate and the light emitting side substrate respectively to form the cavities. Then, subsequently, the first and second transparent glass plates to which the cover member is attached are attached to the light entering side substrate and the light emitting side substrate, respectively.

Accordingly, these transparent glass plate and substrates of the liquid crystal panel are in surface contact with each other, the load due to the cover member is dispersed to the whole of the substrate, so that the load is prevented from localizing onto the liquid crystal panel. Further, when forming the cavities, the liquid crystal panel is not in contact with the first and second transparent glass plates and the cover member, so that the load onto the liquid crystal panel in the manufacturing process can be reduced as well.

Next, a liquid crystal projector according to an embodiment of the present invention in which light emitted from a light source is made to enter a liquid crystal panel and light modulated in the liquid crystal panel is projected by a projection lens, includes a cover member which forms cavities on the light entering side and on the light emitting side of the liquid crystal panel and covers the liquid crystal panel such that a sealed portion of a liquid crystal material is not faced to the cavities, which has holes connecting the cavities and the outside, and which transmits the light entering the liquid crystal panel and light emitted from the liquid crystal panel, wherein a circulation path is formed in which cooling liquid is circulated between the cavities and a radiator to release heat through the hole of the cover member using a pump.

According to the liquid crystal projector, the liquid-cooled liquid crystal panel according to the above described embodiment of the present invention (in which the cover member has holes connecting the cavities and the outside) is used as a liquid crystal panel, and through the holes of the cover member, the cooling liquid is circulated between the cavities and the radiator for heat release by the pump. Accordingly, both of the light entering side and the light emitting side of the liquid crystal panel are cooled by the cooling liquid, and then the cooling liquid warmed by the liquid crystal panel is cooled in the radiator and returns to the liquid crystal panel to again cool the both of the light entering side and light emitting side, so that the rise in temperature of the liquid crystal panel can be restrained sufficiently. Further, since the sealed portion of the liquid crystal material is not immersed in the cooling liquid, exudation of the cooling liquid toward the liquid crystal material can be prevented. Furthermore, with forming such circulation path, natural convection due to the difference in temperature of the cooling liquid is prevented from occurring in the cavities, so that a striped pattern of the natural convection can be prevented from being projected on a screen.

Further, as an example, it is preferable in the liquid crystal projector that a reserve tank to supply the cooling liquid is provided on the circulation path of the cooling liquid. Accordingly, if the cooling liquid evaporates by a slight amount from the piping constituting the circulation path, the liquid crystal panel can be cooled for a long period of time.

Further, as an example, it is preferable in the liquid crystal projector that part of the piping constituting the circulation path swells in the direction perpendicular to the longitudinal direction of the piping, and further swells in rotational symmetry with respect to the longitudinal direction.

In the case where bubbles are generated in cooling liquid in the process of circulating the cooling liquid, if the bubbles enter the cavity on the light entering side of the liquid crystal panel, a dotted pattern is projected on a screen. On the contrary, with the above described swell in part of the piping, air entrapment is formed, so that the bubbles can be prevented from entering the cavity on the light entering side and from being projected as a dotted pattern on the screen. Further, with the swell in rotational symmetry with respect to the longitudinal direction of the piping, in the case where the liquid crystal projector is inclined when being carried or the liquid crystal projector is used by hanging from the ceiling, the bubbles once collected in the air entrapment are prevented from entering the cavity on the light entering side of the liquid crystal panel due to air leakage.

Further, as an example, it is preferable in the liquid crystal projector that a pump with a defoaming function is used as the pump to circulate the cooling liquid; a reserve tank for supplying the cooling liquid is provided upstream in the circulation path of the cooling liquid with respect to the pump having a defoaming function; the cooling liquid from which bubbles are removed by the pump is supplied to the liquid crystal panel; and the cooling liquid containing bubbles extracted by the pump with a defoaming function is returned to the reserve tank.

Accordingly, since bubbles generated in cooling liquid in the process of circulating the cooling liquid are collected in the reserve tank (which can also be used as air entrapment) by repeatedly circulating the liquid between the pump with a defoaming function and the reserve tank, the bubbles are prevented from entering the cavity on the light entering side and being projected as a dotted pattern on a screen.

Further, in the case where the liquid crystal projector is a three-panel liquid crystal projector in which three liquid crystal panels of R, G and B are provided, as an example, it is preferable that the piping joined to the holes of the cover member is used to fix each of the liquid crystal panels to a prism which combines light emitted from the three liquid crystal panels.

Accordingly, since each of the liquid crystal panels is fixed to the prism using the piping itself to reduce the load of the cover member and the piping to the liquid crystal panels, displacement of registration (positioning of pictures of R, G and B) due to the load can be prevented.

Alternatively, as another example, it is preferable that attaching portion in the shape of a projection or a hole is provided on the cover member in order to fix the liquid crystal panel to the prism; each of the liquid crystal panels is fixed to the prism using the attaching portion of the cover member; and the piping joined to the hole of the cover member attached to each of the liquid crystal panels is temporarily fixed to the prism.

Accordingly, since the load of the cover member and the piping to the liquid crystal panel can also be reduced by fixing each of the liquid crystal panels to the prism using the attaching portion for exclusive use and by temporarily fixing the piping to the prism, the displacement of registration caused by the load can be prevented.

BRIEF DESCRIPTION OF THE DRAWINGS

These and other objects and features of the present invention will become clear from the following description of the preferred embodiments given with reference to the accompanying drawings, in which:

FIG. 9 is a view showing a partly modified example of the cooling mechanism shown in FIG. 6.

DESCRIPTION OF THE PREFERRED EMBODIMENTS

Hereinafter, embodiments of the present invention will be described with reference to the drawings, in which the present invention is applied to a TFT liquid crystal panel and a three-panel liquid crystal projector including the TFT liquid crystal panel.

[Liquid-cooled Liquid Crystal Panel According to an Embodiment of the Present Invention]

Figure 1A:
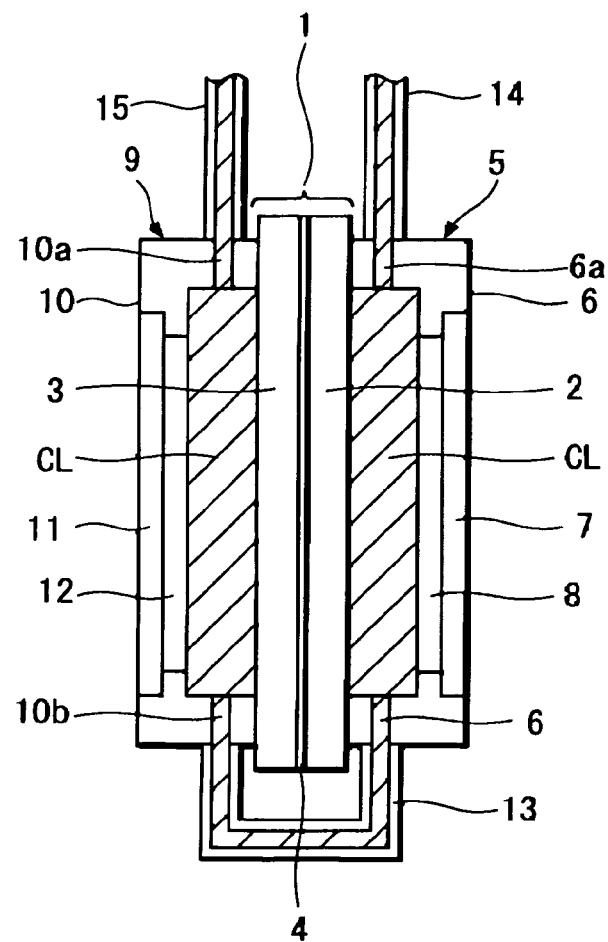
FIGS. 1A and 1B are views showing an example of a constitution of a liquid-cooled liquid crystal panel according to an embodiment of the present invention.
Figure 1B:
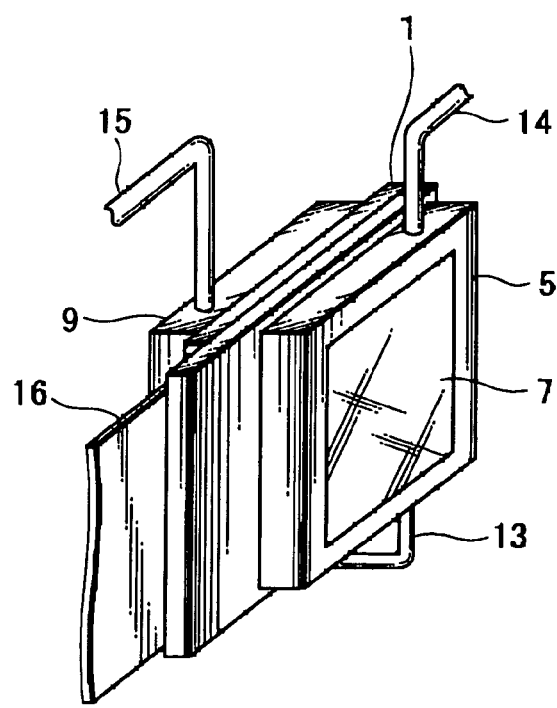

First, a liquid-cooled liquid crystal panel according to an embodiment of the present invention will be explained. FIGS. 1A and 1B are views (FIG. 1A is a sectional view and FIG. 1B is a perspective view including TCP) showing a first example of a constitution of a liquid-cooled liquid crystal panel according to the present invention.

The liquid-cooled liquid crystal panel includes an entering side cooling jacket 5 directly attached to a TFT substrate 2 (a substrate where a TFT element is formed) that is one of two glass substrates constituting a TFT liquid crystal panel 1 and is a light entering side substrate, and an emitting side cooling jacket 9 directly attached to an opposing substrate 3 that is the other of the two glass substrates and is a light emitting side substrate.

The entering side cooling jacket 5 is a member in the shape of covering only the light entering side of the TFT liquid crystal panel 1 such that a cavity is formed on the light entering side of the TFT liquid crystal panel 1, and is formed of a frame member 6 made of metal (or synthetic resin) and a transparent glass plate 7 attached thereto which transmits light entering the TFT liquid crystal panel 1.

Similarly, the emitting side cooling jacket 9 is a member in the shape of covering only the light emitting side of the TFT liquid crystal panel 1 such that a cavity is formed on the light emitting side of the TFT liquid crystal panel 1, and is formed of a frame member 10 made of metal (or synthetic resin) and a transparent glass plate 11 attached thereto which transmits light emitted from the TFT liquid crystal panel 1.

Since the entering side cooling jacket 5 only covers the light entering side of the TFT liquid crystal panel 1 and the emitting side cooling jacket 9 only covers the light emitting side thereof, a sealed portion 4 where a liquid crystal material is sealed between the TFT substrate 2 and the opposing substrate 3 is not faced to the cavities formed by the entering side cooling jacket 5 and the emitting side cooling jacket 9.

On the inner side (that is faced to the cavity) of the transparent glass plate 7 in the entering side cooling jacket 5 is attached a polarizing plate 8 which makes only predetermined linear polarized light (P-polarized light or S-polarized light) enter the TFT liquid crystal panel 1.

On the inner side (that is faced to the cavity) of the transparent glass plate 11 in the emitting side cooling jacket 9 is attached a polarizing plate 12 which makes only predetermined linear polarized light (that is the same linear polarized light as the light made to enter the TFT liquid crystal panel 1 by the polarizing plate 8 in a normally black mode) in the light emitted from the TFT liquid crystal panel 1 transmitted.

In the upper part of the frame members 6 and 10 are provided holes 6a and 10a to connect the cavities and the outside, respectively. Further, in the lower part of the frame members 6 and 10 are provided holes 6b and 10b through which the cavities on the light entering side and on the light emitting side of the TFT liquid crystal panel 1 are connected using a piping 13.

In this liquid-cooled liquid crystal panel, as shown in the figure, the cavities on the light entering side and on the light emitting side are filled with cooling liquid CL and both of the light entering side and the light emitting side of TFT liquid crystal panel 1 are cooled by the cooling liquid CL, so that if the amount of light entering the TFT liquid crystal panel 1 increases, rise in temperature of the TFT liquid crystal panel 1 can be restrained sufficiently.

Further, since the sealed portion 4 is prevented from being immersed in the cooling liquid CL filled in these cavities, (since the sealed portion 4 is not in contact with the cooling liquid CL), exudation of the cooling liquid CL into a liquid crystal material can be prevented.

Further, since the polarizing plates 8 and 12 are in contact with the cooling liquid CL, not only the TFT liquid crystal panel 1, but also polarizing plates 8 and 12 can be cooled.

Further, as shown in the figure, since the piping 14 and piping 15 are attached to the holes 6a and 10a, respectively and the cavities are connected to the outside, a circulation path in which the cooling liquid CL is circulated between those cavities and outside (the cooling liquid CL supplied to one of the cavities on the light entering side and on light emitting side from the outside is conveyed by the piping 13 to the other of the cavities and is conveyed to the outside from the other cavity) is formed, so that TFT liquid crystal panel 1 can be cooled further efficiently. In addition, with a circulation path formed as described above, natural convection due to the difference in temperature of the cooling liquid CL is prevented from occurring in the cavities, so that projection of the natural convection on a screen as a striped pattern can also be prevented.

As a method of attaching the entering side cooling jacket 5 and the emitting side cooling jacket 9 to the TFT substrate 2 and the opposing substrate 3, respectively, there is a method of, for example, bonding the entering side cooling jacket 5 and the emitting side cooling jacket 9 with the TFT substrate 2 and the opposing substrate 3 using silicon-based adhesive, respectively. However, other methods are also available as long as a method is employed by which no cooling liquid CL is leaked from a gap between the TFT substrate 2 and the entering side cooling jacket 5, and a gap between the opposing substrate 3 and the emitting side cooling jacket 9; and depending on kinds of cooling liquid CL, such method is conceivable in which the entering side cooling jacket 5 and the emitting side cooling jacket 9 are pressed toward the TFT substrate 2 and the opposing substrate 3 by mechanical pressure (such as pressure by a spring) to close a gap between the TFT substrate 2 and the entering side cooling jacket 5 and a gap between the opposing substrate 3 and the emitting side cooling jacket 9.

Further, ordinary white plate glass or blue plate glass may be employed as the transparent glass plates 7 and 11, or crystal glass or sapphire glass having higher thermal conductivity can also be used. In addition, water or glycol-based antifreezing fluid can be used as cooling liquid CL.

Figure 2A:
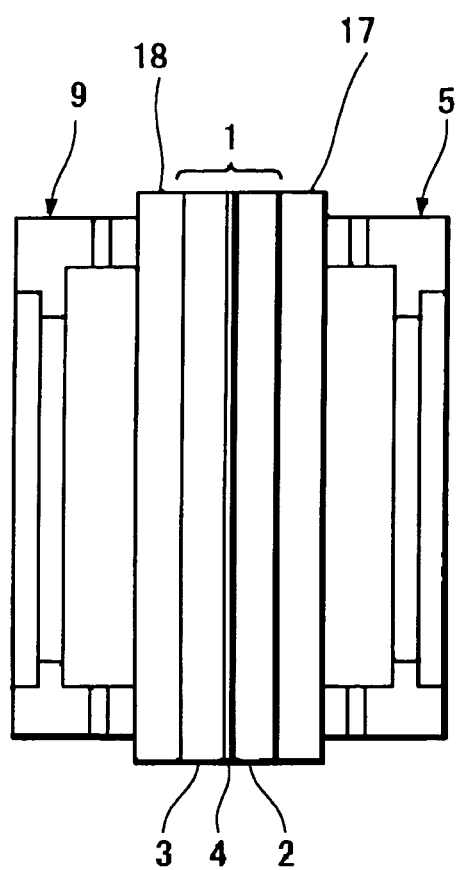
FIGS. 2A and 2B are views showing another example of the constitution of the liquid-cooled liquid crystal panel according to the embodiment of the present invention.
Figure 2B:
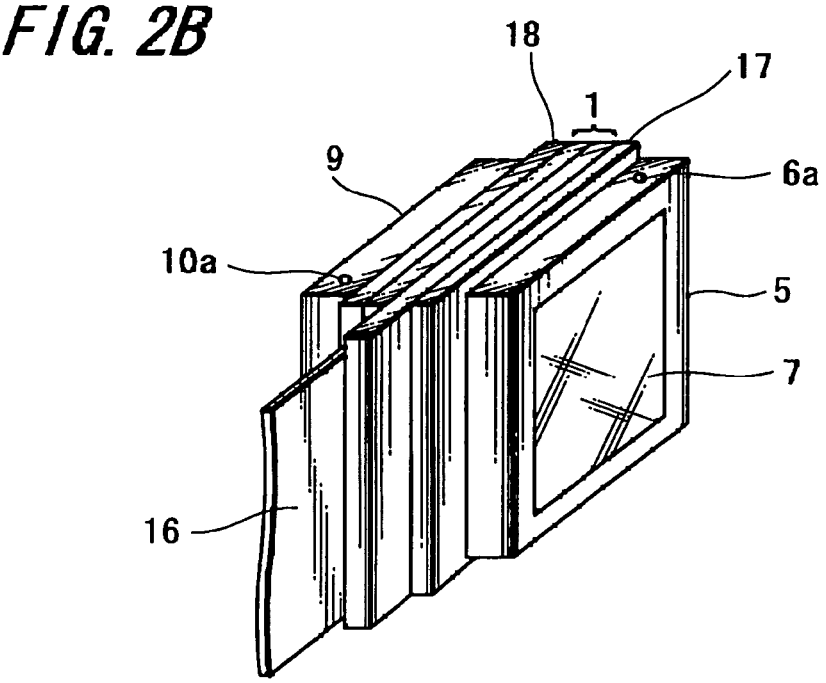

Next, FIGS. 2A and 2B are views (FIG. 2A is a sectional view and FIG. 2B is a perspective view) showing a second example of the constitution of the liquid crystal panel according to the embodiment of the present invention, and the same reference numerals are given to portions in common with FIG. 1 and piping is not described in the figures.

In this liquid-cooled liquid crystal panel, the entering side cooling jacket 5 and the emitting side cooling jacket 9 are attached to the TFT substrate 2 and the opposing substrate 3 respectively through a first transparent glass plate 17 and a second transparent glass plate 18 each of which has approximately equal size to the TFT substrate 2 and opposing substrate 3.

Figure 3A:
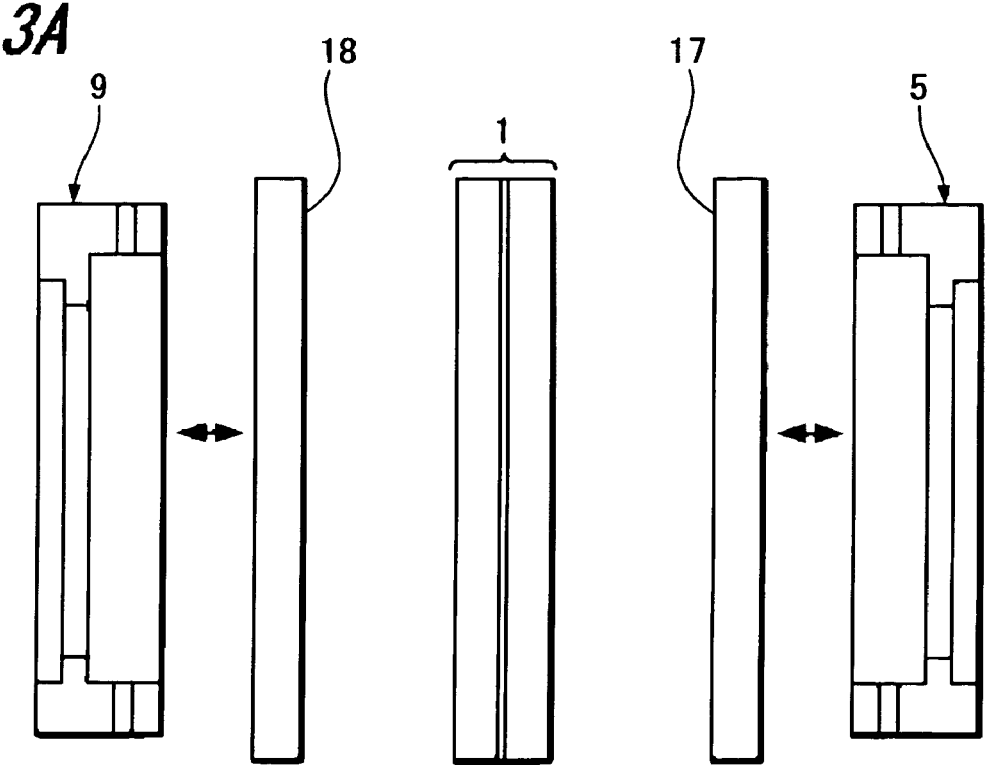
FIGS. 3A and 3B are views showing a method of manufacturing the liquid crystal panel shown in FIGS. 2A and 2B.
Figure 3B:
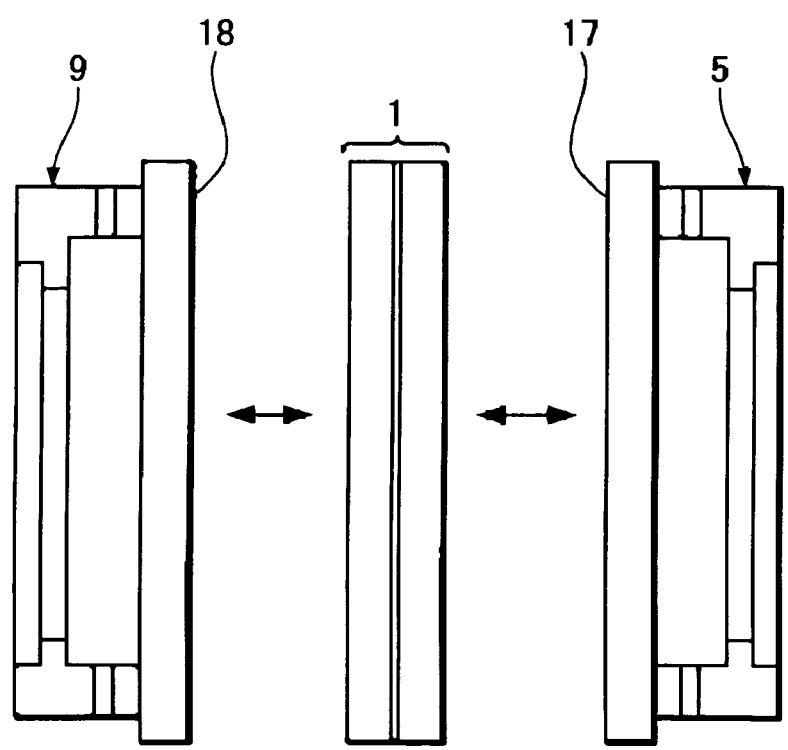

FIGS. 3A and 3B are views showing a method of manufacturing the above liquid-cooled liquid crystal panel. First, as shown in FIG. 3A, the entering side cooling jacket 5 and the emitting side cooling jacket 9 are attached to the transparent glass plate 17 and the transparent glass plate 18 respectively to form cavities capable of being filled with cooling liquid. Subsequently, as shown in FIG. 3B, the transparent glass plate 17 and the transparent glass plate 18, to which the entering side cooling jacket 5 and the emitting side cooling jacket 9 are attached, are attached to the TFT substrate 2 and the opposing substrate 3, respectively.

White plate glass or blue plate glass; quartz glass or Neoceram glass; or crystal glass or sapphire glass can be used as the transparent glass plates 17 and 18.

Further, as a method of attaching the entering side cooling jacket 5 and the emitting side cooling jacket 9 to the transparent glass plates 17 and 18 respectively, there are a method in which silicon-based adhesive is used to bond the entering side cooling jacket 5 and the emitting side cooling jacket 9 to the transparent glass plates 17 and 18, and a method in which after the transparent glass plates 17 and 18 are metallized, the entering side cooling jacket 5 and the emitting side cooling jacket 9 are joined thereto.

According to this liquid-cooled liquid crystal panel, in addition to the same advantageous results as those obtained in the liquid-cooled liquid crystal panel shown in FIGS. 1A and 1B, the transparent glass plates 17 and 18 are in surface contact with the TFT substrate 2 and the opposing substrate 3 to disperse the load caused by the entering side cooling jacket 5 and the emitting side cooling jacket 9 to the whole of the TFT substrate 2 and the opposing substrate 3, whereby the TFT liquid crystal panel 1 can be prevented from receiving localized load. Further, when forming the cavity (at a stage shown in FIG. 3A), the TFT liquid crystal panel 1 is not in contact with any of the transparent glass plates 17 and 18, and the entering side cooling jacket 5 and emitting side cooling jacket 9, so that a load onto the TFT liquid crystal panel 1 caused in a process of manufacturing the liquid-cooled liquid crystal panel can be reduced.

Figure 4A:
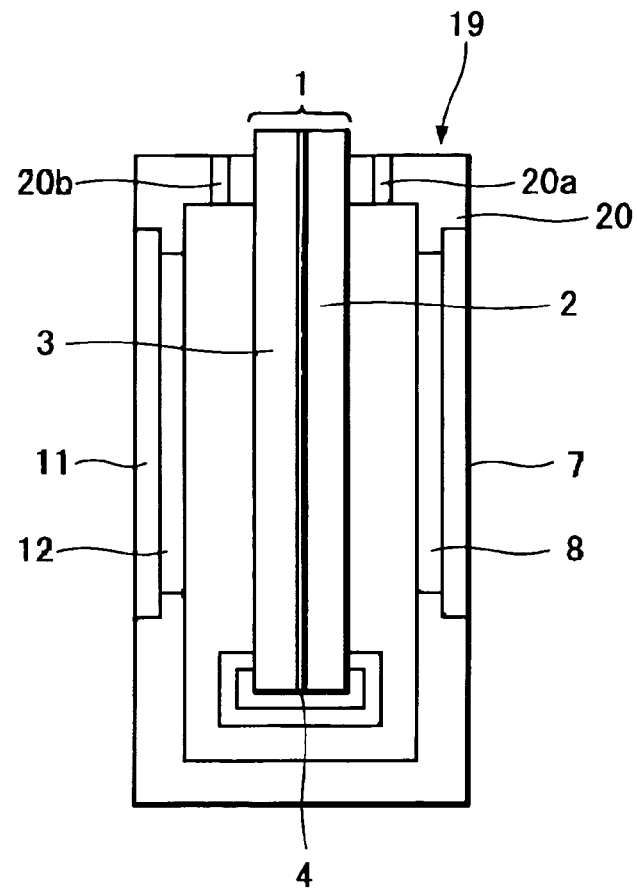
FIGS. 4A and 4B are views showing another example of the constitution of the liquid-cooled liquid crystal panel according to the embodiment of the present invention.
Figure 4B:
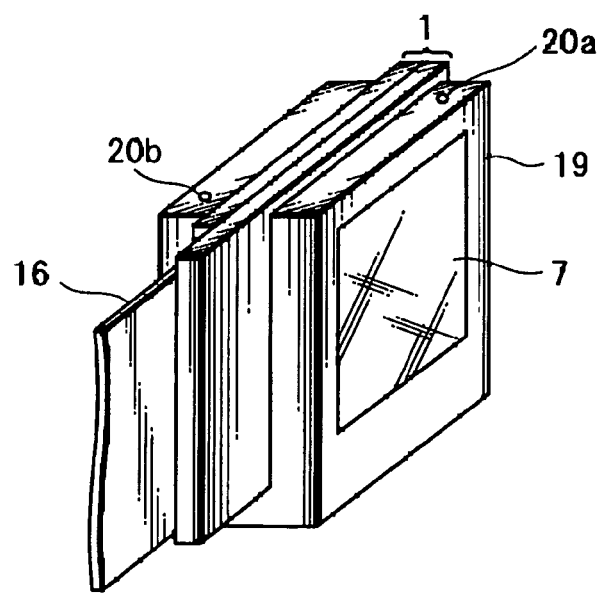

Next, FIGS. 4A and 4B are views (FIG. 4A is a sectional view and FIG. 4B is a perspective view) showing a third example of the constitution of the liquid-cooled liquid crystal panel according to the embodiment of the present invention, and the same reference numerals are given to portions in common with FIG. 1 and piping is not described in the figures.

In this liquid-cooled liquid crystal panel, a single cooling jacket 19 is directly attached to the TFT substrate 2 and the opposing substrate 3 of the TFT liquid crystal panel 1. The cooling jacket 19 has the shape of combination of the entering side cooling jacket 5 and the emitting side cooling jacket 9 shown in FIG. 1, in which the cavity made by the entering side cooling jacket 5 on the light entering side of the TFT liquid crystal panel 1 and the cavity made by the emitting side cooling jacket 9 on the light emitting side of the TFT liquid crystal panel 1 are connected in the lower part of the TFT liquid crystal panel 1 such that the sealed portion 4 is not in contact with the cavities.

Similarly to the frame members 6 and 10 respectively constituting the entering side cooling jacket 5 and emitting side cooling jacket 9 in FIG. 1, in the upper part of the frame member 20 constituting the cooling jacket 19 are provided holes 20*a* and 20*b* to connect the cavities on the light entering side and on the light emitting side, and the outside According to the liquid-cooled liquid crystal panel, in addition to the same advantageous results as those obtained in the liquid crystal panel shown in FIGS. 1A and 1B, the cavity on the light entering side and the cavity on the light emitting side of the TFT liquid crystal panel 1 can be connected without using piping.

Note that in each of the above described embodiments, the polarizing plates 8 and 12 are attached to the entering side cooling jacket 5 and the emitting side cooling jacket 9 to be faced to the cavities filled with the cooling liquid. However, there may be a case where depending on the material of the polarizing plates 8 and 12, preferably the polarizing plates 8 and 12 are not in contact with cooling liquid, and therefore in such case the polarizing plates 8 and 12 may be attached to the front surfaces (that is, the outer side of the transparent glass plates 7 and 11) of the entering side cooling jacket 5 and the emitting side cooling jacket 9, respectively.

Further, in each of the above embodiments, in the upper part of the frame members 6, 10, and 20 constituting the entering side cooling jacket 5, the emitting side cooling jacket 9 and the cooling jacket 19 are provided holes 6*a*, 10*a* and 20*a*, 20*b* to connect the cavities and the outside. However, not limited thereto, such holes may be provided on the front surface (on the surface having the transparent glass plate) and on the side surface of the frame members.

[Liquid Crystal Projector According to an Embodiment of the Present Invention]

Figure 5:
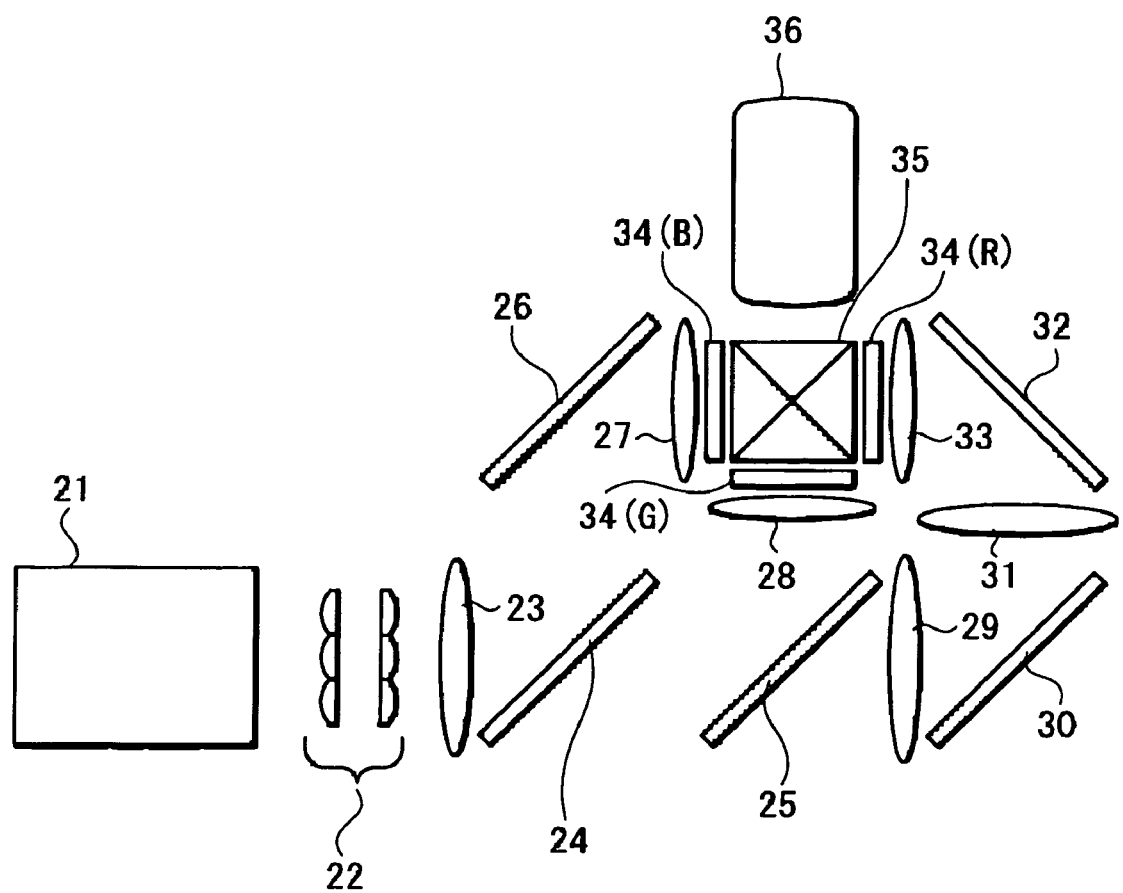
FIG. 5 is a diagram showing an embodiment of an optical system of a three-panel liquid crystal projector to which the present invention is applied.

Next, a liquid crystal projector according to an embodiment of the present invention will be explained. FIG. 5 is a view showing an optical system of a three-plate liquid crystal projector to which the present invention is applied. Light emitted from a light source 21 enters a dichroic mirror 24 through an optical integrator (a pair of fly-eye lenses) 22 and a condenser lens 23. Light beams in the range of the wavelength of blue are reflected by the dichroic mirror 24 and light beams in the range of the wavelength other than that are transmitted. Light beams in the range of wavelength of blue reflected by the dichroic mirror 24 enter a liquid-cooled liquid crystal panel 34(B) for blue light through a reflective mirror 26 and a condenser lens 27.

Light beams transmitted through the dichroic mirror 24 enter a dichroic mirror 25. The dichroic mirror 25 reflects light beams in the range of green and transmits other light beams than those. The light beams in the range of green reflected by the dichroic mirror 25 enter a liquid-cooled liquid crystal panel 34(G) for green light.

The light beams in the range of the wavelength of red transmitted by the dichroic mirror 25 enter a liquid-cooled liquid crystal panel 34(R) through a relay lens 29, a reflective mirror 30, a relay lens 31, a reflective mirror 32 and a condenser lens 33.

The liquid-cooled liquid crystal panels 34(R), 34(G) and 34(B) are the liquid-cooled liquid crystal panels according to the above described present invention and have any of the constitutions shown in FIGS. 1, 2, and 4. In the liquid-cooled liquid crystal panels 34(R), 34(G) and 34(B), light beams in the range of the wavelength of red, green and blue are modulated according to the image signals of R, G, and B, respectively. Then, after the light beams within the range of red color, green color, and blue color modulated in the liquid-cooled liquid crystal panels 34(R), 34(G) and 34(B) are combined by a cross prism 35, the combined light beams are projected on a screen (not shown in the figure) by a projection lens 36.

Figure 6:
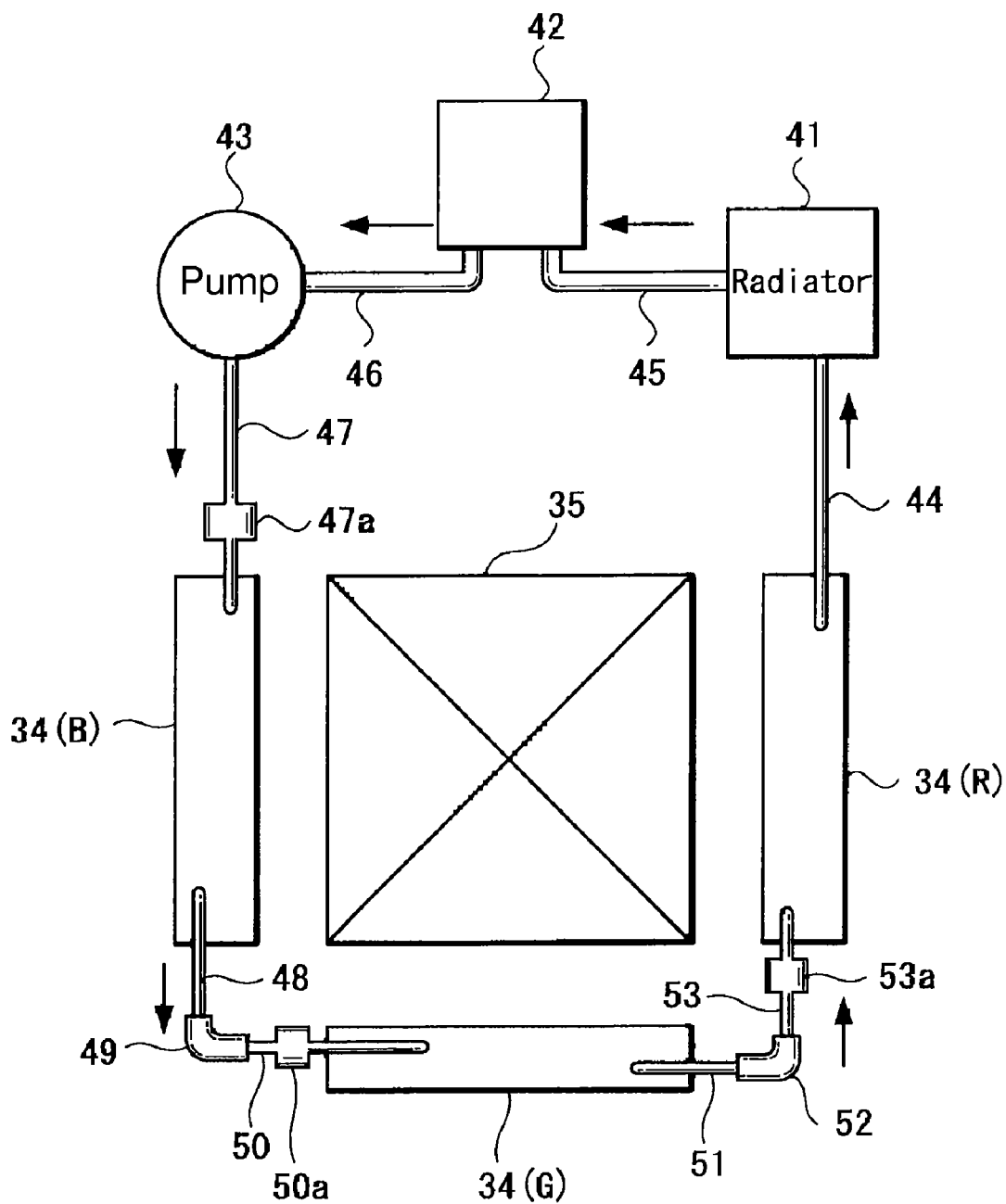
FIG. 6 is a diagram showing a cooling mechanism provided in the three-panel liquid crystal projector shown in FIG. 5.

FIG. 6 shows a cooling mechanism of the liquid crystal panels 34(R), 34(G) and 34(B) provided in the three-plate liquid crystal projector shown in FIG. 5. Through the holes (holes 6*a* and 10*a* in FIGS. 1 and 2, holes 20*a* and 20*b* in FIG. 4), a circulation path is formed using the pipes 44 through 53 including the cavities on the light entering side and the light emitting side (FIGS. 1, 2 and 4) of the liquid-cooled liquid crystal panels 34(R), 34(G) and 34(B), a radiator 41 as a heat sink, and a reserve tank 42 for supplying cooling liquid, in which cooling liquid (water or glycol-based antifreezing liquid) is circulated by a pump 43 in the direction shown by arrows.

Specifically, the cavity on the light entering side of the liquid-cooled liquid crystal panel 34(R) is connected to the radiator 41 by the pipe 44 made of metal (or synthetic resin), the radiator 41 is connected to the reserve tank 42 by the pipe 45 made of metal (or synthetic resin), the reserve tank 42 is connected to the pump 43 by the pipe 46 made of metal (or synthetic resin), and the pump 43 is connected to the cavity on the light emitting side of the liquid-cooled liquid crystal panel 34(B) by the pipe 47 made of metal (or synthetic resin).

Further, the cavity on the light entering side of the liquid-cooled liquid crystal panel 34(B) is connected to the cavity on the light emitting side of the liquid-cooled liquid crystal panel 34(G) by the pipe 48 made of metal (or synthetic resin), the pipe 49 made of rubber, and the pipe 50 made of metal (or synthetic resin); and the cavity on the light entering side of the liquid-cooled liquid crystal panel 34(G) is connected to the cavity on the light emitting side of the liquid-cooled liquid crystal panel 34(R) by the pipe 51 made of metal (or synthetic resin), the pipe 52 made of rubber and the pipe 53 made of metal (or synthetic resin).

Then, the cooling liquid conveyed from the pump 43 to the cavity on the light emitting side of the liquid-cooled liquid crystal panel 34(B) is circulated from the cavity on the light entering side of the liquid-cooled liquid crystal panel 34(B) the cavity on the light emitting side of the liquid-cooled liquid crystal panel 34(G) the cavity on the light entering side of the liquid-cooled liquid crystal panel 34(G)→the cavity on the light emitting side of the liquid-cooled liquid crystal panel 34(R)→the cavity on the light entering side of the liquid-cooled liquid crystal panel 34(R)→the radiator 41→

Defoaming portions 47*a*, 50*a*, and 53*a* are respectively provided in the upstream pipes 47, 50, and 53 with respect to the liquid-cooled liquid crystal panels 34(R), 34(G) and 34(B) among the pipes 44 through 53. These defoaming portions 47*a*, 50*a*, and 53*a* have the same structure, and the structure of the defoaming portion 47*a* is representatively shown in FIG. 7. The defoaming portion 47*a* is formed by swelling part of the pipe 47 in the direction perpendicular to the longitudinal direction of the pipe 47 and in rotational symmetry with respect to the longitudinal direction.

Figure 7:
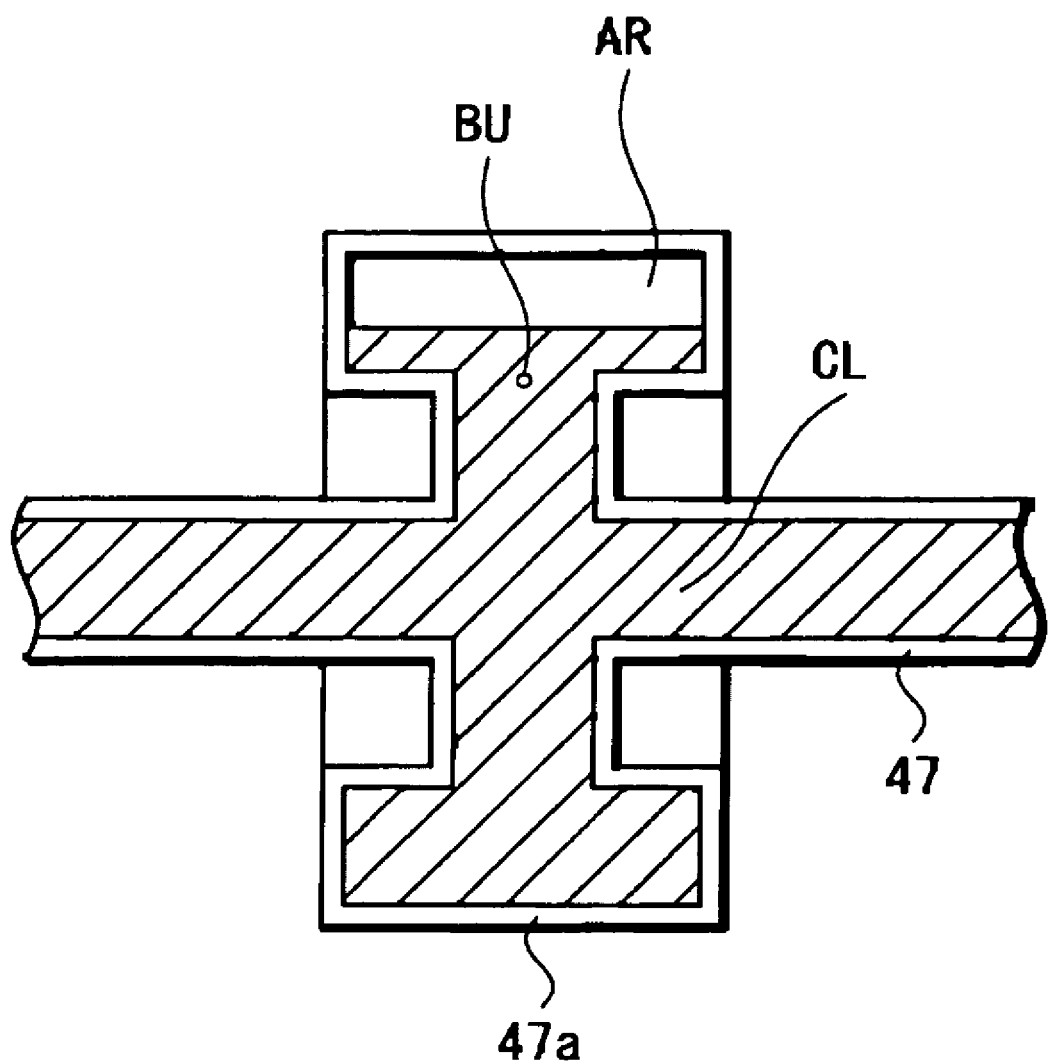
FIG. 7 is a view showing a structure of a defoaming portion in the cooling mechanism shown in FIG. 6.

As shown in FIG. 7, there may be the case where bubbles BU are generated in cooling liquid CL in the process of circulating the cooling liquid CL. The defoaming portion 47*a* is provided to form air entrapment which collects the bubbles BU. Further, the defoaming portion 47*a* is formed in rotational symmetry with respect to the longitudinal direction of the pipe 47, with the result that bubbles once collected in the air entrapment is not easily leaked from the defoaming portion 47*a* in the case where the liquid crystal projector is tilted when carried and where the liquid crystal projector is hung from the ceiling to be used.

Figure 8A:
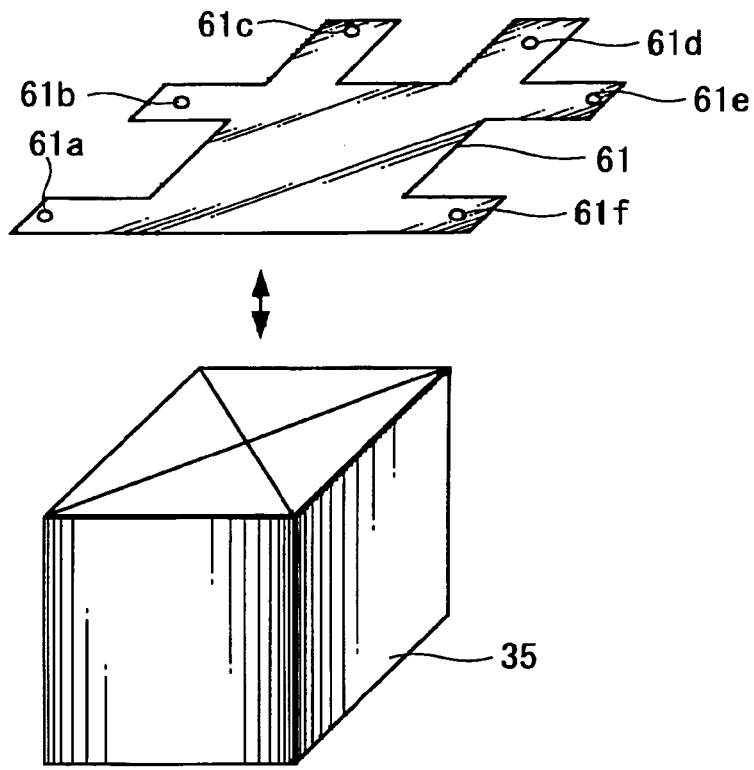
FIGS. 8A and 8B are views showing a procedure for fixing a liquid-cooled liquid crystal panel to a cross prism in the three-panel liquid crystal projector shown in FIG. 5.
Figure 8B:
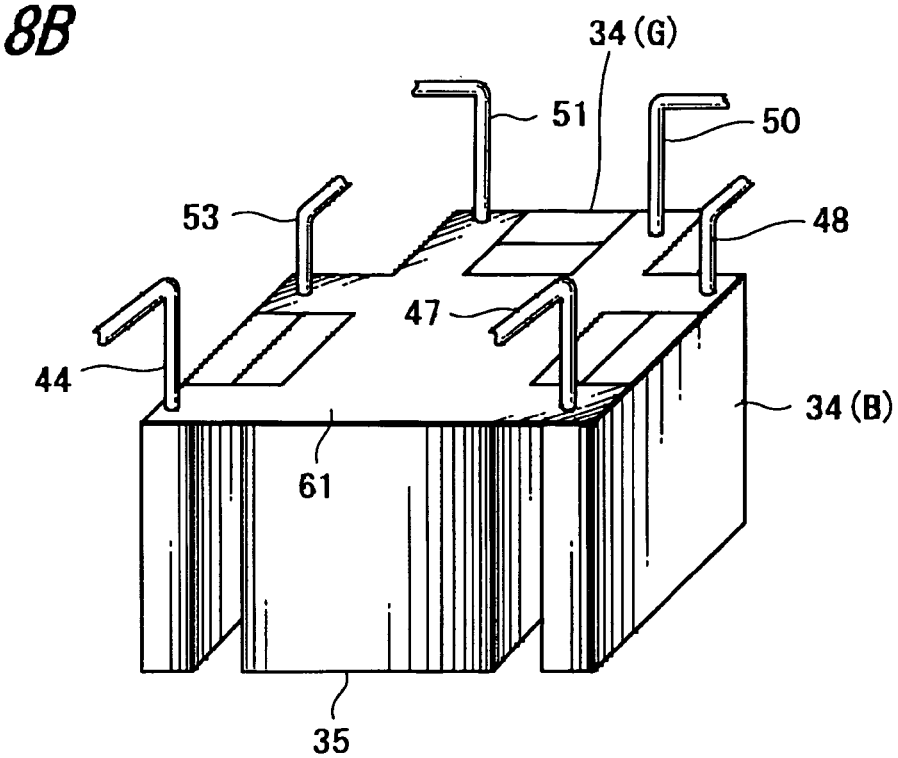

Further, FIGS. 8A and 8B are views showing the procedure in which the liquid-cooled liquid crystal panels 34(R), 34(G) and 34(B) are fixed to the cross prism 35 in the three-plate liquid crystal projector shown in FIG. 5. As shown in FIG. 8A, a panel-fixing metal sheet 61 is attached to the top surface of the cross prism 35. In the panel-fixing metal sheet 61 are provided with holes 61a through 61f each having somewhat larger diameter than the pipes 44, 53, 51, 50, 48 and 47, and each corresponding to the holes provided in the upper part of each of the cooling jackets (the holes 6a and 10a in the example shown in FIGS. 1 and 2, and the holes 20a and 20b in the example shown in FIG. 4) of the liquid-cooled liquid crystal panels 34(R), 34(G) and 34(B).

Subsequently, as shown in FIG. 8B, the pipes 44, 53, 51, 50, 48 and 47 of FIG. 6 penetrate the holes 61a, 61b, 61c, 61d, 61e and 61f of the panel-fixing metal sheet 61 attached to the cross prism 35, respectively. Then, registration adjustment (positioning of each of the R, G, B color images) is performed by slightly displacing the positions of the liquid-cooled liquid crystal panels 34(R), 34(G) and 34(B) (as shown in FIG. 6, since the liquid-cooled liquid crystal panels 34(R), 34(G) and 34(B) are connected to each other using in part rubber pipes 49 and 52, positions of the liquid-cooled liquid crystal panels 34(R), 34(G) and 34(B) can be displaced by the flexibility of those pipes 49 and 52).

After the registration adjustment is completed, those pipes are stuck to the panel-fixing metal sheet 61 using adhesive or the like and the liquid-cooled liquid crystal panels 34(R), 34(G) and 34(B) are fixed to the cross prism 35.

As described above, the liquid-cooled liquid crystal panels 34(R), 34(G) and 34(B) are fixed to the cross prism 35 using the pipes 44, 53, 51, 50, 48 and 47 themselves, so that the load to the liquid-cooled liquid crystal panels 34(R), 34(G) and 34(B), which is caused by the cooling jackets and pipes, can be reduced.

In this liquid crystal projector, both the light entering side and light emitting side of the liquid-cooled liquid crystal panels 34(R), 34(G) and 34(B) are cooled by cooling liquid, and the cooling liquid warmed by the liquid-cooled liquid crystal panels 34(R), 34(G) and 34(B) is cooled in the radiator 41 and then returns to the liquid-cooled liquid crystal panels 34(R), 34(G) and 34(B) to again cool both the light entering side and light emitting side, so that rise in temperature of the liquid-cooled liquid crystal panels 34(R), 34(G) and 34(B) is sufficiently restrained. Further, forming such a circulation path of the cooling liquid prevents natural convention in the cavities of the liquid-cooled liquid crystal panels 34(R), 34(G) and 34(B) due to the difference in temperature of the cooling liquid, whereby projection of such natural convection as a striped pattern on a screen can be prevented.

Further, since the reserve tank 42 to supply the cooling liquid is provided on the circulation path, if the cooling liquid evaporates by a slight amount from the pipes 44 through 53 (particularly, from the rubber pipes 49 and 52), the liquid-cooled liquid crystal panels 34(R), 34(G) and 34(B) can be cooled for a long period of time.

Furthermore, as shown in FIG. 7, bubbles generated in the cooling liquid can be collected in air entrapment within the defoaming portions 47a, 50a and 53a in the pipes 47, 50 and 53, and the bubbles once collected in the air entrapment are not leaked easily, so that projection of the bubbles as a dotted pattern on a screen after the bubbles enter the cavity on the light entering side of the liquid-cooled liquid crystal panels 34(R), 34(G) and 34(B) can be restrained.

Moreover, as shown in FIG. 8, since the liquid-cooled liquid crystal panels 34(R), 34(G) and 34(B) are fixed to the cross prism 35 using the pipes themselves, the load due to the cooling jackets and pipes to the liquid-cooled liquid crystal panels 34(R), 34(G) and 34(B) is reduced, so that the displacement of registration (positioning of each of color pictures R, G and B) caused by the load can be prevented.

Note that, in the example shown in FIG. 6, the cooling liquid cooled in the radiator 41 circulates in the direction of the liquid-cooled liquid crystal panel 34(B)→the liquid-cooled liquid crystal panel 34(G)→the liquid-cooled liquid crystal panel 34(R). This is because the amount of light beams entering the liquid crystal panel for blue is generally larger than that for red in view of characteristics of discharge lamps and visibility, it is intended that cooler cooling liquid be supplied to the liquid-cooled liquid crystal panel 34(B). However, on the contrary, the cooling liquid may be circulated in the direction of liquid-cooled liquid crystal panel 34(R)→the liquid-cooled liquid crystal panel 34(G)→the liquid-cooled liquid crystal panel 34(B).

Further, bubbles generated in the cooling liquid are collected in air entrapment within the defoaming portions 47a, 50a and 53a provided in pipes 47, 50 and 53 in the example shown in FIG. 6. However, instead of the above air entrapment or in addition thereto, the reserve tank 42 may also be used as air entrapment. In order to utilize the reserve tank 42, as shown in FIG. 9, a defoaming-function pump 71 (in which entered liquid is rotated to be collected in the rotational center by centrifugal force) is used, and the cooling liquid CL from which bubbles BU are removed by the defoaming-function pump 71 is sent to the liquid-cooled liquid crystal panel 34(B) and the cooling liquid CL containing bubbles BU, which is obtained in the defoaming-function pump 71 is returned to the reserve tank 42 through the pipe 72. Accordingly, the cooling liquid CL containing bubbles BU is circulated between the defoaming-function pump 71 and the reserve tank 42, air entrapment AR where the bubbles are collected is obtained in the reserve tank 42 (that is, the reserve tank 42 is also used as air entrapment)

Furthermore, in the example of FIGS. 8A and 8B, the liquid-cooled liquid crystal panels 34(R), 34(G) and 34(B) are fixed to the cross prism 35 using pipes 44, 53, 51, 50, 48 and 47 themselves. However, another example is also conceivable in which pins or holes exclusively used for fixing the liquid-cooled liquid crystal panels 34(R), 34(G) and 34(B) to the cross prism 35 are provided in the frame member of the cooling jackets (the frame members 6, 10 of the entering side cooling jacket 5 and the emitting side cooling jacket 9 in FIG. 1 and the frame member 20 of the cooling jacket 19 in FIG. 4); the liquid-cooled liquid crystal panels 34(R), 34(G) and 34(B) are fixed to the cross prism 35 using the pins or holes; and pipes 44, 53, 51, 50, 48 and 47 are temporarily fixed to the cross prism 35 using adhesive or the like made of a kind of materials having flexibility after cured. With this, the load to the liquid crystal panel due to the cooling jackets and pipes is reduced, so that the displacement of the registration due to this load can be prevented.

Furthermore, although in the above embodiments the present invention is applied to a TFT liquid crystal panel and a three-plate liquid crystal projector, the present invention is not limited thereto and may be applied to other liquid crystal panels than the TFT liquid crystal panel, and a single plate liquid crystal projector.

While the invention has been described with reference to specific embodiments chosen for the purpose of illustration, it should be apparent that numerous modification could be made thereto by those skilled in the art without departing from the basic concept and scope of the invention.

What is claimed is:

1. A liquid-cooled liquid crystal panel comprising:
   first and second substrates between which is held a liquid crystal material, said first substrate being a light emitting side of the liquid crystal panel and the second substrate being a light entering side of the liquid crystal panel;
   a first cover member attached to said first substrate, said first cover member comprising a first transparent substrate secured over said first substrate and a first light transmitting window spaced from said transparent substrate, a first cavity capable of containing cooling liquid being provided between said first transparent substrate and said first light transmitting window, said first cover member further including a polarizing layer also spaced from said first transparent substrate;
   a second cover member attached to said second substrate, said second cover member comprising a second transparent substrate and a second light transmitting window spaced from said second transparent substrate, a second cavity capable of containing cooling liquid being provided between said second transparent substrate and said second light transmitting window, said second cover member further including a polarizing layer also spaced from said second transparent substrate; and
   a cooling liquid filling said first and second cavities, wherein,
   said liquid crystal material and said cooling liquid are separated from each other, and
   said polarizing layers are positioned between their respective light transmitting windows and their respective transparent substrates.

2. The liquid-cooled liquid crystal panel according to claim 1, wherein said first and second cavities are in fluid communication.

3. The liquid-cooled liquid crystal panel according to claim 2, further comprising a circulation system in fluid communication with said cavities and operative to circulate cooling liquid through said cavities.

4. The liquid-cooled liquid crystal panel according to claim 1, further comprising a circulation system in fluid communication with said cavities and operative to circulate cooling liquid through said cavities.

5. The liquid-cooled liquid crystal panel according to claim 1,
   wherein said cover member has an opening via which the cavity is in fluid communication external to the cavity.

6. A method of manufacturing a liquid-cooled liquid crystal panel comprising the steps of:
   providing a liquid crystal panel having liquid crystal material sealed between two light transmitting substrates, one substrate being a light emitting side and the other substrate being a light entering side of the liquid crystal panel;
   forming cavities in which cooling liquid can be contained by attaching first and second cover members to respective first and second transparent plates, each transparent plate having approximately the length and width dimensions as the light entering side substrate and the light emitting side substrate of said liquid crystal panel, respectively, each of said cover members including a light transmitting window layer; and
   attaching said first and second transparent glass plates, to which cover members are respectively attached, to the light entering side substrate and to the light emitting side substrate of said liquid crystal panel, respectively.

7. A liquid crystal projector in which light emitted from a light source enters a liquid crystal panel and light modulated by said liquid crystal panel is emitted from a projection lens, comprising:
   at least one liquid crystal panel having a light entering side and a light emitting side, and liquid crystal material between said sides, said liquid crystal panel having two substrates with a liquid crystal material therebetween;
   a pair of cover members attached to said at least one liquid crystal panel such that said cover members form cavities over the light entering side and over the light emitting side of said liquid crystal panel and cover said liquid crystal panel such that a sealed portion of a liquid crystal material is not in communication with said cavities, said cavities being constructed that they are in fluid communication with each other and outside of said cavities
   cooling liquid in said cavities; and
   a circulation system,
   wherein,
   each cover member comprises a transparent substrate secured over one of said liquid crystal panel substrates and a light transmitting window spaced from said transparent substrate, a light transmitting panel spaced from said transparent substrate, and a polarizing panel adjacent the light transmitting panel and between said light transmitting panel and said transparent substrate so that said cavity capable of containing cooling liquid is provided between said transparent substrate and said polarizing panel,
   a circulation path to circulate said cooling liquid by a pump through said cavities and a radiator for heat release exits between said circulation system and said cavities.

8. The liquid crystal projector according to claim 7, wherein a reserve tank to supply said cooling liquid is provided in said circulation path.

9. The liquid crystal projector according to claim 7, wherein part of a pipe constituting said circulation path is swelled in the direction perpendicular to the longitudinal direction of said pipe.

10. The liquid crystal projector according to claim 9, wherein part of the pipe constituting said circulation path is swelled in the direction perpendicular to the longitudinal direction of said pipe and in rotational symmetry with respect to said longitudinal direction.

11. The liquid crystal projector according to claim 7, wherein said pump is a defoaming-function pump, a reserve tank to supply said cooling liquid is provided upstream in said circulation path with respect to said defoaming-function pump, and said cooling liquid from which bubbles are removed by said defoaming-function pump is sent to said liquid crystal panel and said cooling liquid containing bubbles collected by said defoaming-function pump is returned to said reserve tank.

12. The liquid crystal projector according to claim 7, comprising three liquid crystal panels are, and
   each of said liquid crystal panels is fixed to a prism that combines light emitted from said three liquid crystal panels using pipes extending from its respective cover member.

13. The liquid crystal projector according to claim 7,
further comprising three liquid crystal panels, each with a respective pair of cover members,
wherein,
each pair of cover member has an attaching portion which has the shape of a protrusion or a hole to fix its respective liquid crystal panel to a prism that combines light emitted from said three liquid crystal panels, and
each of said liquid crystal panels is fixed to said prism using said attaching portion of said cover members, and a pipe joined to said said pair of cover members is temporarily fixed to said prism.

14. A liquid-cooled liquid crystal panel comprising:
first and second substrates between which is held a liquid crystal material, said first substrate being a light emitting side of the liquid crystal panel and the second substrate being a light entering side of the liquid crystal panel;
a cover member attached to one of said first and second substrates, said cover member comprising a transparent substrate secured over said one substrate and a light transmitting window spaced from said transparent substrate, a cavity capable of containing cooling liquid being provided between said transparent substrate and said light transmitting window; and
a cooling liquid in said cavity,
wherein,
said liquid crystal material and said cooling liquid are separated from each other.

15. The liquid-cooled liquid crystal panel of claim 14, comprising a second cover member attached to the other of said first and second substrates, said second cover member comprising a second transparent substrate and a second light transmitting window spaced from said second transparent substrate, a second cavity capable of containing cooling liquid being provided between said second transparent substrate and said second light transmitting window.

16. The liquid-cooled liquid crystal panel of claim 14, wherein said cover member further includes a polarizing layer also spaced from said transparent substrate.

* * * * *